Sept. 21, 1965  P. H. ROSE  3,207,982
APPARATUS FOR MEASURING AND DISPLAYING THE CHARACTERISTICS
OF BEAMS OF CHARGED PARTICLES
Filed April 19, 1961  3 Sheets-Sheet 1

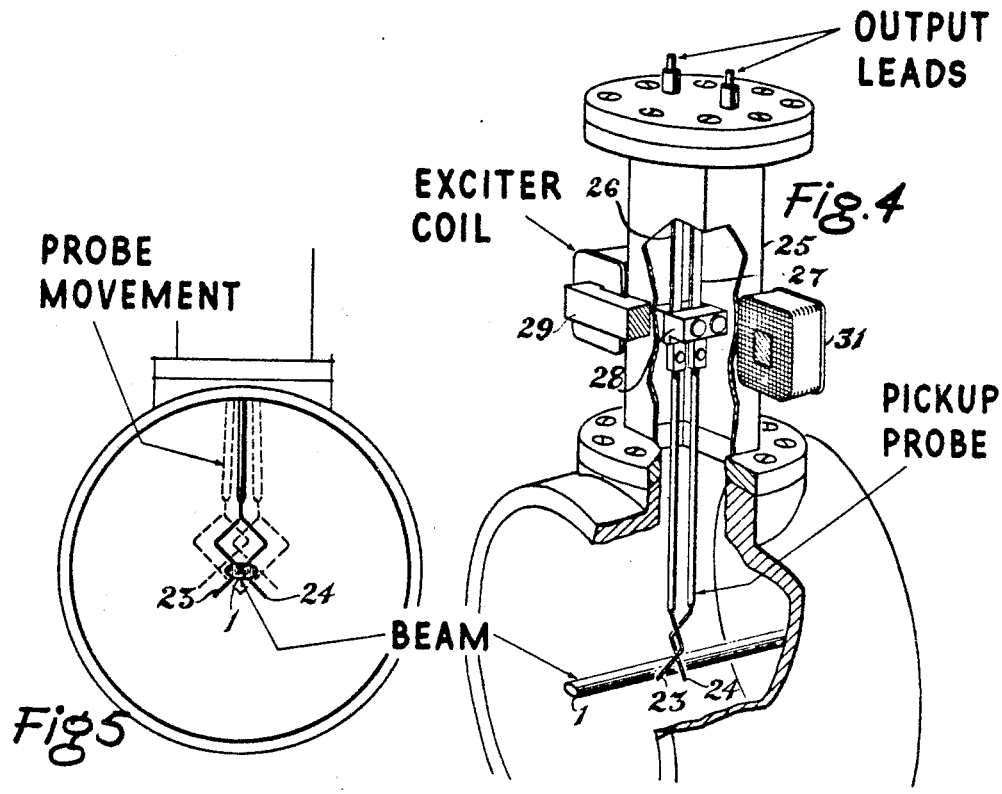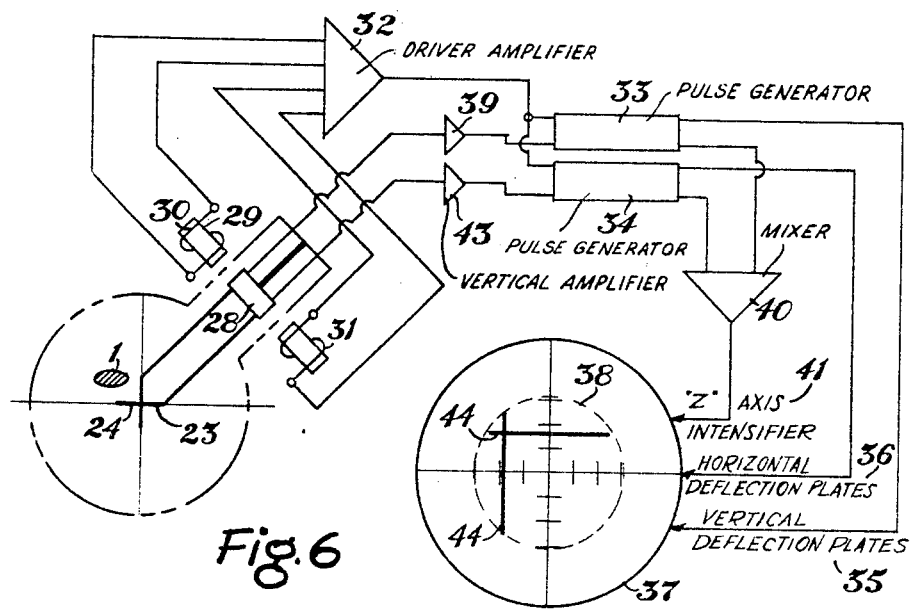

United States Patent Office 3,207,982
Patented Sept. 21, 1965

3,207,982
APPARATUS FOR MEASURING AND DISPLAYING THE CHARACTERISTICS OF BEAMS OF CHARGED PARTICLES
Peter H. Rose, Bedford, Mass., assignor to High Voltage Engineering Corporation Burlington, Mass., a corporation of Massachusetts
Filed Apr. 19, 1961, Ser. No. 104,105
3 Claims. (Cl. 324—71)

This invention relates to the measurement of the characteristics of beams of charged particles and in particular to simple apparatus for intercepting a very small fraction of a charged particle beam at the point where its characteristics are to be measured. In accordance with the invention, a probe of electrically conductive material whose area transverse to the beam is a small fraction of the beam's cross section is caused repeatedly to pass through the charged particle beam. While the probe thus intercepts the beam, electric charge is delivered to the probe at a rate which is proportional to the beam current density integrated over the area of interception. The current impulses thus received are recorded on an appropriate display or recording device such as a conventional oscilloscope.

The invention may best be understood from the following detailed description thereof having reference to the accompanying drawings in which:

FIG. 4 is a somewhat diagrammatic view in perspective illustrating another embodiment of the invention in which two signals are obtained by causing two conductors to intercept the charged particle beam;

FIG. 5 is a somewhat diagrammatic end view of the apparatus of FIG. 3;

FIG. 6 is a circuit diagram illustrating a circuit for taking the double signal from the apparatus of FIGS. 3 and 4 for beam position presentation;

Figure 1:
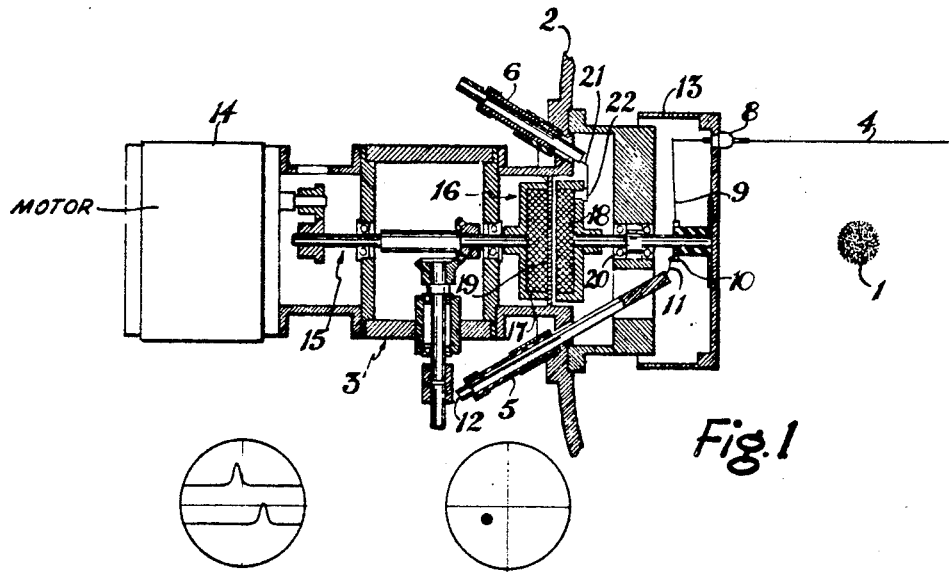
FIG. 1 is a view principally in central section showing one embodiment of my invention.

Referring to the drawings and first to FIG. 1 thereof, the charged particle beam 1 which is to be measured will in general be in an evacuated chamber 2, and the beam-interceptor assembly 3 of the invention is mounted upon this chamber 2 so that a probe 4 lies within the evacuated chamber 2 while the electrical leads 5, 6 therefrom pass out through the evacuated chamber 2 as shown. This beam-interceptor assembly 3 is mounted on the evacuated chamber 2 at the point at which it is desired to measure the characteristics of the beam 1.

In the embodiment of the invention shown in FIG. 1 the probe 4 comprises a single stiff wire mounted on a rotating disk 7 by means of an insulating bushing 8 through which the electrical connection 9 passes to an insulated slip ring 10 which rotates with the main disk 7 and is in contact with a brush 11 connected to an output terminal 12 via the electrical lead 5. A tubular shroud 13 of conductive material is mounted on the disk 7 and serves electrically to shield all parts of the beam-interceptor assembly 3 from the beam 1 except for the proble 4. The disk 7 is caused to rotate by means of a motor 14 which is connected to the disk 7 by an appropriate transmission 15 which includes a magnetic clutch 16. The magnetic clutch (or, alternatively, some similar device, not shown, such as a rotary bellows) is necessary to transmit the rotary motion from outside the evacuated chamber 2 to the inside thereof. The magnetic clutch 16 includes a driving magnet 17 and a driven magnet 18 separated by a blank-off 19 which forms part of the wall of the chamber 2. The driven magnet 18 is fixed to the main disk 7 by an appropriate coupling 20 and has a raised portion 21 which makes contact with a second brush 22 just before the probe 4 enters the beam 1. This second brush 22 thus delivers a trigger signal to the oscilloscope or other display apparatus via the electrical lead 6.

Figure 2:
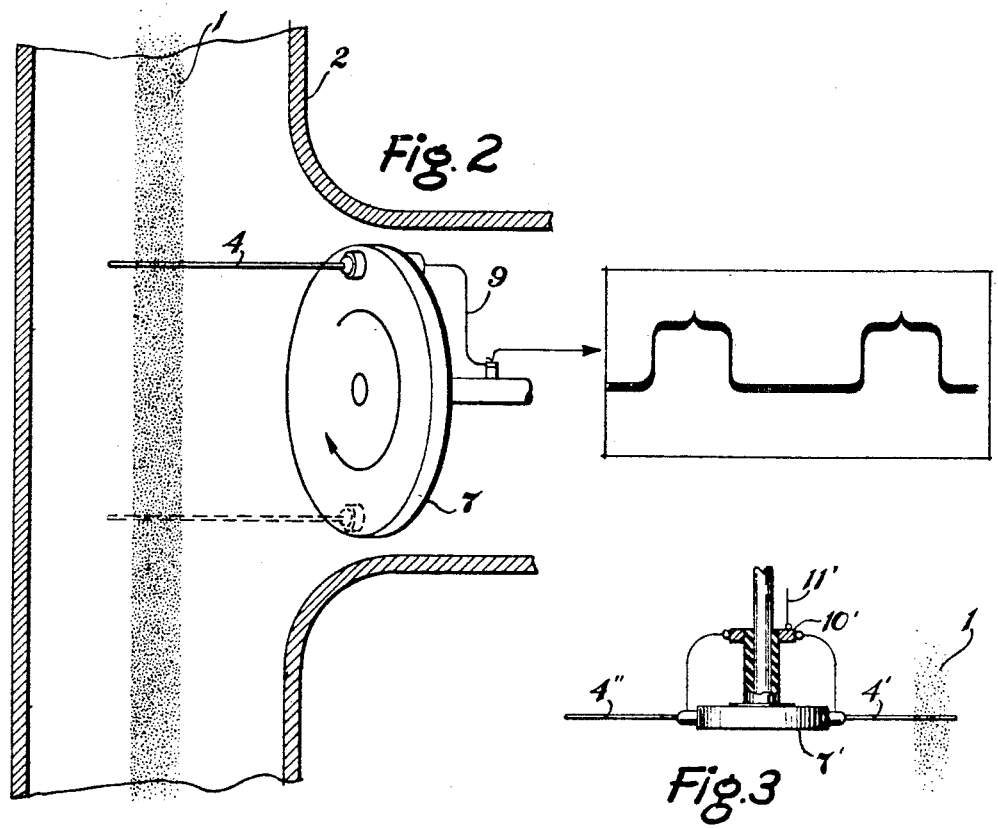
FIG. 2 is a circuit diagram showing how the signal generated by the apparatus of FIG. 1 is recorded.

The signal produced by the apparatus of FIG. 1 is as shown in the diagram of FIG. 2. The oscilloscope display thus shows the beam diameter as well as the beam profile at two positions along its length. In this way not only is the beam diameter known but it is also known whether or not this beam diameter changes; that is to say, whether the beam is diverging or converging. The beam profile also shows how the charge density is distributed across the beam's cross section. By appropriate calibration of a fixed line of the oscilloscope screen, the position of the beam with respect to a corresponding axis within the vacuum chamber 2 will also be shown.

Figure 3:
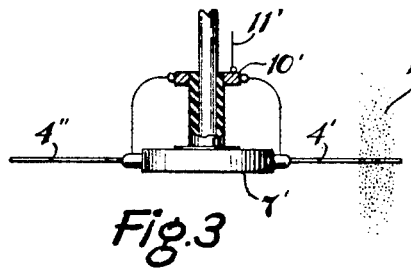
FIG. 3 is a view similar to that of FIG. 2 and showing a modification of the beam interceptor of the apparatus of FIGS. 1 and 2.

In the apparatus of FIGS. 1 and 2 centrifugal force may distort the configuration of the probe 4. To avoid such distortion, the probe may be mounted in the plane of the disk so as to extend radially therefrom. A second proble may then be used for mechanical balance. Thus, referring to FIG. 3, the disk 7' therein shown has two probes 4' and 4" mounted thereon along the line of diameter of the disk 7'.

Referring now to FIGS. 4 and 5, therein is shown a device having two probes 23, 24 in which one probe 23 is caused to traverse the beam in one direction while the second probe 24 is caused to traverse the beam in a direction perpendicular to that in which the first probe 23 traverses the beam. This embodiment thus provides two signals, but the two probes 23, 24 move together and are mounted on a common mount 25 for this purpose. The two probes 23, 24 are deformed so as to form a cross as shown and are caused to traverse the beam 1 in such a way that each probe 23, 24 moves in a direction at approximately a 45° angle to the probe itself. As a result, although in fact both probes 23, 24 are moving always in the same direction with respect to each other, with respect to the beam 1 they are moving at right angles to one another since, as either of the probes 23, 24 moves through the beam 1, the component of its motion parallel to itself has no effect whatever on its collection of charge from the beam 1. Therefore, the only significant components of motion from the point of view of current measurement are the component of motion perpendicular to each probe 23, 24. The crossed probes 23, 24 of FIGS. 4 and 5 could be mounted on a rotating disk in a manner similar to that in which the single probe 4 of FIG. 1 is mounted. Alternatively, the two probes 23, 24 may be mounted on spring-like members 26, 27, respectively, to which vibrating motion is imparted electromechanically by clamping the spring-like members 26, 27 between a block 28 of magnetic material to which motion is imparted by the oscillating magnetic field of the electromagnet 29 which is driven by an exciter coil 30. The vibratory technique of FIGS. 4 and 5 avoids the distortion of the probe by centrifugal force which results when apparatus of the type shown in FIGS. 1 and 2 is rotated at high speeds.

Referring now to FIG. 6, therein is shown a circuit for presenting beam position using the signals from the apparatus of FIGS. 4 and 5. The electromagnet 29 is linked not only by the exciter or driver coil 30 but also by a pickup coil 31, which feeds a signal into the driver amplifier 32. The output from the driver amplifier 32 is applied to the driver coil 30 so that oscillation of the block 28 is maintained with a minimum expenditure of electrical power. The frequency of oscillation may, but need not, be adjusted so that the block 28 and the associated apparatus to which it imparts mechanical motion vibrate at the resonant frequency of the assembly which is supported on the mount 25 in cantilever. A signal from the driver amplifier 32 is applied to the inputs of two pulse generators 33 and 34 respectively and thence to the vertical deflection plates 35 and the horizontal deflection plates 36 respectively of an oscilloscope 37. These signals are in phase so that if the electron beam of the oscilloscope 37 had any observable intensity it would trace out a circle on the oscilloscope as indicated by the dotted line 38. However, in operation the electron beam of the oscilloscope 37 does not ordinarily have any intensity except as hereinafter noted so that the circle will not in practice be visible.

The current of the beam 1 which is intercepted by the probe 23 which moves in a horizontal direction provides an input signal to the horizontal amplifier 39 whose output signal is fed into the pulse generator 33. The pulse generator 33 is adjusted so that it gives a pulse when the output signal from the horizontal amplifier 39 reaches its maximum value. The resultant pulse from the pulse generator 33 is then fed to the vertical deflection plates 35 and to the mixer 40 which in turn produces an output signal which is fed to the z axis intensifier 41. The pulse generated by the pulse generator 33 thus not only increases the intensity of the electron beam of the oscilloscope 37 so as to make its trace observable on the screen of the oscilloscope 37, but this pulse also imparts a sudden strong signal to the vertical deflection plates 35 with the result that the vertical trace indicated at 42 is drawn on the oscilloscope 37 and indicates the horizontal position of the beam 1. In a similar fashion, the horizontally disposed probe 24 delivers a current signal to the vertical amplifier 43 which is proportional to the current intercepted by the probe 24 from the beam 1 and the output from the vertical amplifier 43 is fed to the second pulse generator 34, which is so constructed as to generate an output pulse when the output from the vertical amplifier 43 reaches its maximum. The resultant pulse from the pulse generator 34 is fed not only to the horizontal deflection plates 36 but also to the mixer 40 which in turn provides a signal to the $x$-axis intensifier. The result is that the electron beam of the oscilloscope 37 traces a horizontal line as indicated at 44 which indicates the vertical position of the beam 1.

Figure 7:
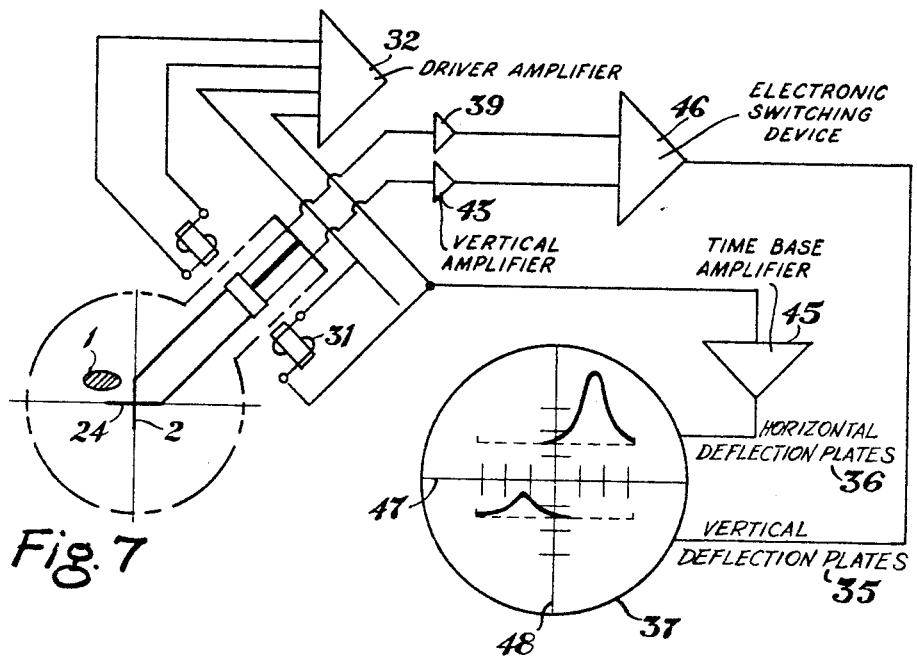
FIG. 7 is a circuit diagram illustrating a circuit for taking the signal from the apparatus of FIGS. 3 and 4 and displaying the same for beam profile presentation.

Referring now to FIGURE 7 the circuit therein shown is in many respects similar to that shown in FIGURE 6. Referring now to said FIGURE 7, the position of the electron beam of the oscilloscope 37 is caused to correspond to that of the scanning probes 23 and 24 by means of a signal which is derived directly from the pickup coil 31, although it would be equally possible to obtain the signal from the driver amplifier 32 as was the case in the circuit diagram of FIGURE 6. The signal from the pickup coil 31 is fed into a time base amplifier 45 from which it is applied to the horizontal deflection plates 36. As in the case of the circuit diagram of FIGURE 6, the current collected by the probe 23 is fed into the horizontal amplifier 39 while that collected from the probe 24 is fed into the vertical amplifier 43. However, in the circuit diagram of FIGURE 7, the outputs of both the horizontal amplifier 39 and the vertical amplifier 43 are fed into an electronic switching device 46 which serves to bias the output signal from the horizontal amplifier 39 with respect to that from the vertical amplifier 43, as these signals are fed to the vertical deflection plates 35. The electronic switching device 46 also serves alternately to transmit the output signal from either the horizontal amplifier 39 or the vertical amplifier 43 while suppressing that from the other. Thus, the electron beam of the oscilloscope 37 traces two traces which are vertically displaced with respect to each other. One trace is proportional to the signal from the horizontal amplifier 39 while the other trace is proportional to the output signal from the vertical amplifier 43. As a result, the oscilloscope indicates not only the position of the beam but also its profile. The fiduciary marks 47 and 48 of the oscilloscope 37 are so positioned as to correspond with the ideal axis within the evacuated chamber 2.

Figure 8:
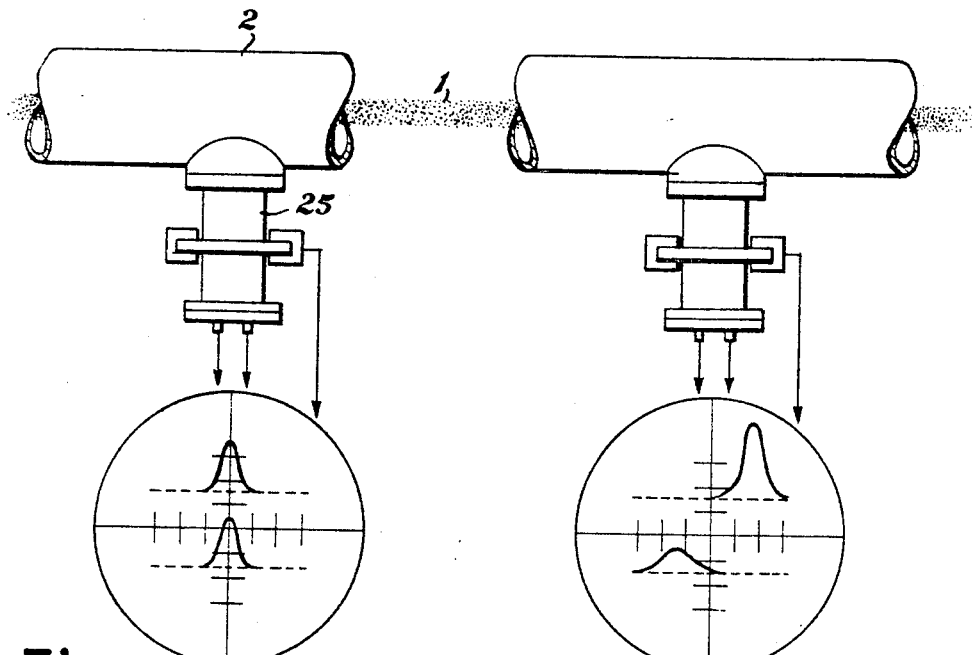
FIG. 8 is a diagram illustrating measurement of the charged particle beam at two points along its length for complete measurement of the beam's properties.

As indicated in the device of FIGURE 8, by utilizing two beam interceptors of the type described and claimed herein, it is possible to obtain information as to beam divergence.

The apparatus of the invention can be used in effect as a beam defining slit. Movement of the beam away from the center could be made to generate an appropriate signal that would correct the situation in a well known manner. However, whereas the conventional slits intercept 10% of the beam current, the device of FIG. 2, for example, would intercept only a .05%, assuming the charge collector has a diameter of five thousandths of an inch and moves over a circle 12 inches in circumference.

I claim:

1. Apparatus for repeatedly producing an electric current the magnitude of which varies, as a function of time, in a manner which is related to the current density in a beam of charged particles as a function of a transverse dimension thereof and for displaying said electric current, comprising in combination an elongated, stiff conductor, means for supporting said conductor in the path of the beam to be measured, means for moving said conductor in a cylindrical path about an axis which is parallel to that of the conductor, means for displaying current pulses collected by said conductor in passing through said beam, and means for superimposing the displays from successive current pulses on one another.

2. Apparatus for repeatedly producing a pair of electric currents the magnitudes of which vary, as a function of time, in a manner which is related to the current density in a beam of charged particles as a function of a corresponding pair of transverse dimensions thereof, and for displaying said electric currents, comprising in combination a mount, a first elongated, stiff conductor supported on said mount, a second elongated, stiff conductor supported on said mount, means for imparting oscillatory motion to said mount, each of said conductors having a portion the axis whereof is at a substantial angle to the direction of oscillatory movement and to the axis of the other conductor, means for supporting said mount so that said portions traverse the beam to be measured during the oscillatory motion, means for displaying current pulses collected by each conductor in passing through said beam, and means for superimposing the displays from successive current pulses from each conductor on one another.

3. Apparatus for displaying the position of a beam of charged particles relative to an axis in space comprising in combination wherein two conductors repeatedly produce a pair of electric currents the magnitude of which vary, as a function of time, in a manner which is related to the current density in the beam to be measured as a function of a corresponding pair of transverse dimensions thereof, a mount having magnetic material, a first elongated, stiff conductor supported on said mount, a second elongated, stiff conductor supported on said mount, a magnetic circuit having a gap, means flexible in one dimensional plane for supporting said mount so that the movement of said mount which is permitted by said flexible means causes said magnetic material to traverse said gap so as to vary the reluctance of said magnetic circuit, a driver coil linking said magnetic circuit, a pickup coil linking said magnetic circuit, means for applying an A.C. voltage across said driver coil, means for applying the E.M.F. generated in said pickup coil to said driver coil, whereby said driver coil imparts oscillatory motion to said mount at the resonant frequency of said flexible means, each of said conductors having a portion of the axis whereof is at a substantial angle to the direction of oscillatory movement and to the axis of the other conductor, said mount being so supported that said portions traverse the beam to be measured during the oscillatory motion, whereby said two conductors repeatedly produce a pair of electric currents the magnitudes of which vary, as a function of time, in a manner which is related to the current density in the beam to be measured as a function of a corresponding pair of transverse dimensions thereof, an oscilloscope having a screen means for producing an electron beam and directing it onto said screen, intensifying means for intensifying said electron beam so as to increase the visibility of the mark made by it on said screen, and a pair of deflecting means for deflecting said electron beam along a corresponding pair of directions, means for applying the E.M.F. generated in said pickup coil to the deflecting means of said oscilloscope so that a circular deflection is imparted to said electron beam thereby, and means for applying said pair of currents to said pair of deflecting means and to said intensifying means, whereby said electron beam is caused to display a pair of straight lines which intersect at a point on the screen corresponding to the position of the beam to be measured relative to an axis in space.

References Cited by the Examiner

UNITED STATES PATENTS

| | | | |
|---|---|---|---|
| 2,820,947 | 1/58 | Gunn | 324—32 X |
| 2,912,646 | 11/59 | Pilny | 250—49.5 X |

WALTER L. CARLSON, *Primary Examiner.*

FREDERICK M. STRADER, *Examiner.*